Patented May 24, 1949

2,471,108

UNITED STATES PATENT OFFICE 2,471,108

TREATMENT OF SULFUR CONTAINING HYDROCARBONS

Boyd N. Hill, Baytown, Tex., assignor, by mesne assignments, to Standard Oil Development Company, Elizabeth, N. J., a corporation of Delaware No Drawing. Application June 6, 1947, Serial No. 753,038

11 Claims. (Cl. 196—32)

The present invention is directed to the removal of sulfur and acidic constituents from hydrocarbons containing them.

Shortly after the discovery of petroleum in the United States, it became apparent that the substantially sulfur-free crude oils were in limited supply. When the sulfur-free crude oils first became available, numerous methods including acid and alkali treatment were suggested. Indeed, the employment of acid treatment and treatment with alkaline reagents has become universal in the petroleum industry. Even until the present day nearly all modern petroleum refineries employ treatment with alkaline reagents in one form or another. Employment of acid and alkaline reagents has been modified in numerous ways.

The prior art investigators particularly have used alkali as solutions, in the dried state, and in the molten state. The prior art investigators have also proposed the employment of alkali sulfides such as alkali monosulfides. Numerous patentees have suggested employing solutions of the alkali sulfides for the removal of elementary sulfur. Usually when employing the solutions, temperatures in the range between 160° F. to 200° F. have been required to make the reaction proceed at a rate sufficient for economical treatment of the hydrocarbon. Other and later workers have suggested employment of the alkali polysulfides for removing sulfur from hydrocarbons. The prior art workers seem to have directed their efforts in employing the alkali sulfides to the employment of aqueous solutions of these materials. Employment of solutions is advantageous where the solutions are mobile and may be readily pumped. This method is also disadvantageous in that a considerable amount of reagent must be handled which requires expensive equipment.

The detrimental effects of corrosive materials in motor fuels is well understood by those skilled in the art. Such materials are not only detrimental due to their tendency to corrode internal combustion engines, but also because they, particularly those compounds containing sulfur, impair the motor fuel from the standpoint of its anti-knock quality and its response to tetraethyl lead. It is, therefore, very desirable to remove these undesirable substances by an economical process.

It is, therefore, the main object of the present invention to provide a method for removing sulfur and acidic constituents from hydrocarbons containing them by contacting the contaminated hydrocarbon with a bed or mixture of solid alkali sulfide, alkali hydroxide and clay in which the water content and the clay content are adjusted within critical limits.

In accordance with the present invention a contaminated hydrocarbon including sulfur and/or inorganic and organic acid constituents is contacted under substantially atmospheric conditions with a bed comprising clay and alkali hydroxide and alkali sulfide, the clay content being in the range of 5% to 30% by weight of the bed while the water content of the bed is maintained in the range between 30 to 50 weight percent.

Briefly, the present invention may be described as involving the formation of a bed or a mixture including clay such as calcium montmorillonite, other montmorillonites such as sodium montmorillonite, bauxite, gibbsite, terrana, and similar clay materials, an alkali sulfide such as sodium monosulfide, and an alkali hydroxide such as sodium hydroxide, adjusting the water content of the bed or mixture in the range between 30% and 50% by weight while the clay content is maintained in the range between 5% to 30% by weight of the bed or mixture. The hydrocarbon is allowed to contact the bed under substantially atmospheric conditions for a time sufficient to remove substantial amounts of the sulfur and acidic constituents.

The water content and the clay content of the bed are critical. If less than approximately 5% of clay or more than approximately 30% of clay are maintained in the bed, unsatisfactory results are obtained. Similarly, when the clay content of the bed is in the range of 5% to 30% and the water content is less than 30% or greater than 50% by weight, unsatisfactory results are also obtained.

The ratio of alkali sulfide to alkali hydroxide on an anhydrous basis should be in the range of 1:1 to approximately 5:1, depending, of course, on the sulfur content and other contaminating bodies in the hydrocarbon. Ordinarily, a ratio of sodium sulfide to sodium hydroxide in the range from about 1:1 to 4:1 will be satisfactory provided the clay content and water content of the bed are within the critical limits mentioned.

The alkali sulfide may be any of the alkali sulfides such as lithium sulfide, sodium sulfide, or potassium sulfide. It is to be understood that the alkali polysulfides may be used in lieu of the monosulfides, although the latter are to be preferred. Likewise, the alkali hydroxide may be lithium hydroxide, sodium hydroxide, or potassium hydroxide although for economical reasons the sodium hydroxide will be preferred.

The temperatures employed in the present invention ordinarily will be substantially atmospheric temperatures. However, temperatures in the range from about 35° F. to about 120° F. may be employed satisfactorily. Pressures will ordinarily be atmospheric pressures except under instances where it is desired to treat the lighter hydrocarbons, such as those containing substantial amounts of butane or lighter materials, at the higher temperatures in the limit mentioned. The process of the present invention may be accomplished by forming a bed of clay, sodium hydroxide, and sodium monosulfide within the critical limits mentioned above. The hydrocarbon to be treated is passed through the bed at a temperature within the range mentioned above. The size of the bed may be calculated to provide the necessary residence time to remove substantially all of the sulfur and acidic constituents from the hydrocarbon being treated.

In forming a bed including the constituents mentioned above in the critical ranges, it may be desirable to employ a clay such as calcium montmorillonite which will contain a small quantity of water. To the clay may be added sodium monosulfide containing water of crystallization and sodium hydroxide. The water content of the bed may be adjusted by adding water directly to the bed, or by removing water from the bed by blowing the bed containing a substantial amount of water, as water originally contained in the clay, or as water of crystallization in the sodium monosulfide. Under these conditions, water may be removed by contacting the bed with a heated gas such as heated methane or other inert gas such as nitrogen, carbon dioxide and the like. After the bed has had its water content adjusted within the critical range mentioned above, the temperature of the bed may be reduced to atmospheric, if a heated gas has been employed to remove water therefrom, and the hydrocarbon from which contaminants are to be removed passed over and through the bed at substantially atmospheric conditions.

In order to illustrate the beneficial results of the practice of the present invention, a number of beds were prepared by thoroughly mixing calcium montmorillonite, crystalline sodium sulfide ($Na_2S \cdot 9H_2O$) with flake sodium hydroxide by grinding in a suitable apparatus to mix thoroughly the materials. The water contents of the several beds were then adjusted by addition of water or by drying the beds with inert gas such as by blowing with methane which may be heated to a temperature of approximately 120° F.

Seven beds were made up of varying water and clay content and containing sodium sulfide and sodium hydroxide on an anhydrous basis in an amount in the range between 1:1 and 4:1. These beds have been designated as beds A, B, C, D, F, G, and H. An eighth bed I including only sodium sulfide and sodium hydroxide was also prepared. Beds A through D contained sodium sulfide and sodium hydroxide on an anhydrous basis in an amount in the ratio of 4:1. Bed F contained equal amounts of sodium sulfide and sodium hydroxide on an anhydrous basis. Bed G contained sodium sulfide and sodium hydroxide in a ratio slightly in excess of 2:1 of sodium sulfide to sodium hydroxide. Bed H contained sodium sulfide in excess of sodium hydroxide and in the ratio of about 2½:1 while bed H comprised sodium sulfide and sodium hydroxide in the ratio of 3:1. Hydrocarbon distillates containing various amounts of sulfur were then allowed to percolate downwardly through each of the beds. The hydrocarbon distillates charged to each of the beds were tested for corrosion by the copper strip test and by the mercury test and were found to be badly off test in each case. The results of these runs are presented in the following table:

TABLE I

| Bed | Sulfur Content, Wt. Percent | | Corrosion Test on Filtrate | |
|---|---|---|---|---|
| | Charge | Filtrate | Copper Strip Test | Mercury Test |
| A | 0.3010 | | Off | Off. |
| B | 0.4647 | 0.0208 | Pass | Pass. |
| C | 0.6703 | 0.0180 | do | Do. |
| D | 0.6750 | | Off | Off. |
| F | 0.6381 | 0.0168 | Pass | Pass. |
| G | 0.6325 | 0.0212 | do | Do. |
| H | 0.6425 | 0.0228 | do | Do. |
| I | 0.6364 | | Off | Off. |

It will be noted from the foregoing data in Table I that beds B, C, F, G, and H produced a satisfactory product as reflected by a substantially reduced sulfur content and a product passing both the copper strip test and the mercury test while beds A, D, and I produced a product which did not pass either the copper strip test or the mercury test. Repeated efforts to treat the material which had been contacted with beds A, D, and I were unsuccessful even when the filtrate was passed repeatedly through the beds for as much as five times. It will be apparent from the foregoing data that a substantial reduction in sulfuric content was effected and that the filtrate from the other beds satisfactorily passed the tests which are indicative of corrosive sulfur. It will be apparent that reactive sulfur has not been removed by treatment of the distillates with beds A, D, and I.

In order to emphasize the benefits of the present invention and to illustrate the criticality of the water and clay content of the beds, calculations have been made from the data in the foregoing Table I to show the barrels of hydrocarbon per ton of bed which can be treated to remove 0.01 weight percent of elementary sulfur. Table II shows the clay and water contents of beds A to D inclusive:

TABLE II

*Effect of water content upon activity of bed*

| Bed | Clay Content of Bed, Wt. per cent | Water Content of Bed, Wt. per cent | Bbls./Ton of Bed Based on Removal of 0.01 Wt. per cent Reactive Sulfur |
|---|---|---|---|
| A | 42.0 | 13.3 | 0 |
| B | 29.3 | 39.6 | 9,703 |
| C | 23.3 | 48.1 | 11,225 |
| D | 22.5 | 53.6 | 0 |

It will be apparent from the foregoing that bed A which contains 42% by weight of clay and 13.3% by weight of water allowed no removal of elementary sulfur whereas beds B and C which contained clay and water within the critical limits mentioned allowed removal of 0.01 weight percent of elementary sulfur from 9,703 and 11,225 barrels, respectively, per ton of bed contacted with the hydrocarbon. It will be further apparent that bed D which contained water slightly in excess of the critical limitation but clay in the range found necessary was also ineffective in removing sulfur. These data compare with the data shown in Table I in which beds A and D were ineffective in passing the distillate to the copper strip and mercury test specification.

Table III presents similar information to Table II in which the clay contents and water contents of beds F through I are given:

TABLE III

*Effect of clay content upon activity of bed*

| Bed | Clay Content of Bed, Wt. per cent | Water Content of Bed, Wt. per cent | Bbls./Ton of Bed Based on Removal of 0.01 wt. per cent Reactive Sulfur |
|---|---|---|---|
| F | 30.2 | 37.8 | 12,872 |
| G | 9.6 | 49.5 | 14,321 |
| H | 4.4 | 53.6 | 7,486 |
| I | 0.0 |  | 0 |

It will be seen that bed G where both the clay content and the water content are in the critical range allowed removal of sulfur from 14,321 barrels of hydrocarbon per ton of bed to be treated, based on the removal of 0.01 weight per cent of elementary sulfur. Bed F in which the clay content was slightly in excess of the limitation of 30% allowed treatment of a smaller amount than bed G, whereas bed H in which the clay content was below the limitation of 5% allowed treatment of still lesser quantities. It will be noted that bed H contained slightly in excess of the required water content. Bed I which contained three parts of sodium sulfide to one part of sodium hydroxide and no clay was ineffective. Similar to the discussion with relation to Table I, it will be noted that the material contacted with bed I was off both the copper strip and mercury test.

The copper corrosion test is that described in ASTM Standards on Petroleum Products and Lubricants, prepared by ASTM Committee D-2 on Petroleum Products and Lubricants, Methods of Testing Specifications, Definitions, Charts, and Tables, December 1946, page 289, published by American Society for Testing Materials. This method of test is indicative of sulfur compounds which are corrosive to the copper strip and is a valuable tool in controlling the corrosivity of sulfur compounds in petroleum products.

The mercury test is indicative of reactive sulfur in the presence of clean metallic mercury and comprises shaking a measured amount of the hydrocarbon being tested with a measured amount of clean mercury for a stated period of time. After the shaking has been concluded, the container, containing the hydrocarbon undergoing test with the mercury, is allowed to stand. The sample undergoing test is then compared with a product known to be free of reactive sulfur which similarly has been shaken with metallic mercury. If the mercury shows no discoloration when compared with the blank sample, it may be said that the material passes the mercury test. As mentioned before, this test is indicative of reactive sulfur.

While the foregoing invention has been described and illustrated by reference to employment of sodium hydroxide and sodium sulfide as the alkali hydroxide and alkali sulfide, it must be mentioned that potassium hydroxide and potassium monosulfide gives better results than the corresponding sodium compounds. However, it will usually be desirable to employ the sodium compounds rather than the potassium compounds because sodium hydroxide and sodium monosulfide are cheaper than the potassium compounds.

The invention has been described with respect to percolating or filtering the oil through a fixed bed of the clay, alkali sulfide, and alkali hydroxide mixture having a critical concentration of clay and water. It is to be understood that while the fixed bed operation may be preferred, the invention is not to be restricted to such operations. For example, it may be desirable to suspend a mixture of clay, alkali sulfide, and alkali hydroxide in the liquid hydrocarbon to be treated, intimately admixing the solid with the hydrocarbon to form a slurry and allowing the mixture of alkali sulfide and alkali hydroxide and clay to remain in contact with the hydrocarbon for a time sufficient to remove substantial quantities of sulfur and acidic constituents therefrom. The treating reagent may then be allowed to separate from the hydrocarbon under the influence of gravity, separated from the hydrocarbon and re-used, if necessary, to treat further quantities of untreated hydrocarbons. When a suspension of the treating reagent is formed in the hydrocarbon, it may be desirable to withdraw periodically a quantity of the treating reagent which has been in contact with the hydrocarbon and replace it with an equivalent quantity of fresh reagent.

The nature and objects of the present invention having been completely described and illustrated, what I wish to claim as new and useful and to secure by Letters Patent is:

1. A method for treating a hydrocarbon distillate containing sulfur and acidic constituents which includes the steps of forming a bed of clay, alkali sulfide and an alkali hydroxide, having a water content in the range between 30% and 50% of the bed and a clay content in the range between 5% and 30% of the bed, contacting a contaminated hydrocarbon distillate containing sulfur and acidic constituents with said bed, and recovering a treated distillate from the bed.

2. A method in accordance with claim 1 in which the alkali sulfide is sodium mono-sulfide and the alkali hydroxide is sodium hydroxide.

3. A method in accordance with claim 1 in which the alkali sulfide is potassium mono-sulfide and the alkali hydroxide is potassium hydroxide.

4. A method in accordance with claim 1 in which the alkali sulfide and alkali hydroxide are employed in the bed in a ratio in the range between 1:1 and 5:1.

5. A method for removing sulfur and acidic constituents from hydrocarbons containing them which comprises contacting a hydrocarbon containing sulfur and acidic constituents with a mixture of clay, alkali sulfide, and alkali hydroxide, said mixture having a water content in the range between 30% and 50% by weight of the mixture, a clay content in the range between 5% and 30% by weight of the mixture, and the alkali sulfide and alkali hydroxide in the mixture are in a ratio in the range between 1:1 and 5:1, and recovering a substantially sulfur and acid free hydrocarbon from contact with said mixture.

6. A method for removing sulfur and acidic constituents from hydrocarbons containing them which comprises forming a mixture containing between 5% and 30% by weight of clay, 30% to 50% by weight of water, sodium sulfide and sodium hydroxide in the ratio between 1:1 and 5:1, contacting a hydrocarbon distillate containing sulfur and acidic constituents and having a final boiling point no greater than 600° F. with said mixture under substantially atmospheric conditions for a time sufficient to remove sulfur compounds and acidic constituents therefrom, and recovering from contact with the mixture said hydrocarbon distillate substantially free of sulfur and acidic constituents.

7. A method for treating a contaminated hydrocarbon distillate containing sulfur and acidic constituents which includes the steps of forming a bed of clay, alkali sulfide and alkali hydroxide, the clay content of said bed being in the range between 5% and 30% by weight of the bed, adjusting the water content of the bed in the range between 30% and 50% by weight of the bed, contacting a hydrocarbon containing sulfur and acidic constituents with said bed under substantially atmospheric conditions and for a time sufficient to remove sulfur and acidic constituents therefrom, and recovering a treated distillate from the bed.

8. A method in accordance with claim 7 in which the alkali sulfide is sodium mono-sulfide and the alkali hydroxide is sodium hydroxide.

9. A method in accordance with claim 7 in which the alkali sulfide is potassium mono-sulfide and the alkali hydroxide is potassium hydroxide.

10. A method in accordance with claim 7 in which the alkali sulfide and alkali hydroxide are employed in the bed in a ratio in the range between 1:1 and 5:1.

11. A method for removing sulfur and acidic constituents from hydrocarbons containing them which comprises forming a mixture containing between 5% and 30% by weight of clay, 30% to 50% by weight of water, alkali sulfide and alkali hydroxide in the ratio between 1:1 and 5:1, forming a suspension of the mixture in a hydrocarbon distillate containing sulfur and acidic constituents and having a final boiling point no greater than 600° F. under substantially atmospheric conditions for a time sufficient to remove sulfur compounds and acidic constituents therefrom, separating the mixture from the suspension in the hydrocarbon distillate and recovering a hydrocarbon distillate substantially free of sulfur and acidic constituents.

BOYD N. HILL.

REFERENCES CITED

The following references are of record in the file of this patent:

UNITED STATES PATENTS

| Number | Name | Date |
|---|---|---|
| 1,777,619 | Low | Oct. 7, 1930 |
| 1,903,094 | Darrow | Mar. 28, 1933 |
| 2,081,309 | Schulze | May 25, 1937 |